(12) United States Patent
Spencer

(10) Patent No.: US 10,625,650 B1
(45) Date of Patent: Apr. 21, 2020

(54) ARMREST ASSEMBLY WITH IN-ARM CUP HOLDER

(71) Applicant: B/E Aerospace, Inc., Winston-Salem, NC (US)

(72) Inventor: Gregory S. Spencer, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/164,985

(22) Filed: Oct. 19, 2018

(51) Int. Cl.
*B60N 3/10* (2006.01)
*B60N 3/12* (2006.01)
*B64D 11/06* (2006.01)
*B60N 3/18* (2006.01)
*A47C 7/62* (2006.01)
*B60R 11/00* (2006.01)

(52) U.S. Cl.
CPC ............... *B60N 3/12* (2013.01); *A47C 7/624* (2018.08); *B60N 3/10* (2013.01); *B60N 3/18* (2013.01); *B64D 11/0638* (2014.12); *B60R 2011/0014* (2013.01)

(58) Field of Classification Search
CPC ... B60N 3/10; B60N 3/12; B60N 3/18; B64D 11/0638; A47C 7/624; B60R 2011/0014
USPC ............... 297/188.14, 188.16, 188.18, 250.1
See application file for complete search history.

(56) References Cited

U.S. PATENT DOCUMENTS

| | | | | |
|---|---|---|---|---|
| 3,468,582 A * | 9/1969 | Judd | ................... | B64D 11/064 297/445.1 |
| 4,186,964 A * | 2/1980 | Marrujo | ............. | B64D 11/0646 297/411.45 |
| 2015/0375660 A1 * | 12/2015 | Gaudreau, Jr. | ........ | B60N 3/103 297/188.14 |

* cited by examiner

*Primary Examiner* — Syed A Islam
(74) *Attorney, Agent, or Firm* — Clements Bernard Walker Law

(57) ABSTRACT

An armrest assembly and aircraft passenger seat including the same, the armrest assembly including an arm having a top cutout and a cup holder insert disposed within the top cutout and retained on the arm by front and rear arm caps affixed atop the arm that overlap portions of the installed cup holder insert, the cup holder insert including a recessed center portion at depth within the arm and disposed between upstanding concave end walls, the cup holder insert usable to secure a beverage or other items when the arm is in a deployed use position.

18 Claims, 9 Drawing Sheets

ARMREST ASSEMBLY WITH IN-ARM CUP HOLDER

BACKGROUND

Passengers regularly consume food and beverages while traveling on aircraft and other conveyances. Food and beverages may be supplied by a carrier or may be brought on board by passengers. Either way, passengers require a place to secure food and beverages to avoid the inconvenience of having to continuously hold these items.

With respect to passenger aircraft, tray tables can be utilized to secure food and beverages during flight. Tray tables typically include a tabletop configured to transition between a stowed position during taxi, take-off and landing, and a use position during flight, oftentimes changing tabletop orientation between the two positions. For example, tray tables may deploy from against the backside of a forward backrest. In another example, tray tables may deploy from alongside a passenger seat. While the former are typically utilized with economy and premium economy class passenger seats in second and subsequent rows, the latter are typically utilized in premium seating classes and the first row of each seating class.

While tabletops are well suited to support meal trays and food items, they are inadequate to properly secure beverage containers and impractical to deploy to support only beverage containers. As such, passenger seats are commonly equipped with dedicated cup holders located, for example, adjacent the passenger seat, deployable from within the backrest, within adjacent furniture and consoles, etc. Backrest-mounted cup holders are particularly disadvantageous in that they require a deployment mechanism, consume backrest space reserved for tray tables and other amenities, and must deploy out of the way of the use position of the tray table and without interfering with backrest recline function. Conventional seat-mounted cup holders may deploy, for example, from within an armrest. These types of cup holders are disadvantageous in that they require a deployment mechanism that typically positions the cup holder into the seat space and/or interfere with the use of the armrest. Deployment of a cup holder into the seat space further disadvantageously positions the cup holder in the way of seat ingress and egress, where such mechanisms are most likely to be damaged.

Accordingly, what is needed is a cup holder that can be located in a convenient and readily-accessible seat component out of the way and separate from a seat tray table, as well as a cup holder that does not require a deployment mechanism, does not interfere with or detract from seat component usage, facilitates rapid cleaning and replacement, and is robust to withstand prolonged use and repeated cycling of the seat component. Such a cup holder would be particularly well-suited for use with an economy class aircraft passenger seat.

BRIEF SUMMARY

In one aspect, embodiments of the inventive concepts disclosed herein are directed to an armrest assembly including an arm having a top cutout, an insert bracket affixed within the arm adjacent the top cutout, an insert removably disposed within the top cutout and supported by the insert bracket, a front arm cap affixed atop the arm and extending from near a front of the arm to one end of the insert, and a rear arm cap affixed atop the arm and extending from near a back of the arm to an opposing end of the insert.

In another aspect, the top cutout may be disposed proximate the front of the arm and may be continuous along a top of the arm and a portion of opposing sides of the arm.

In a further aspect, the insert may be a cup holder having a recessed center portion disposed between spaced upstanding concave walls, the recessed center portion disposed at depth within the arm.

In a further aspect, each side of the insert may include an open portion and a portion that overlaps a respective side of the arm.

In a further aspect, the armrest assembly may further include a rail affixed atop the insert bracket, and a retainer assembly disposed within the arm, the retainer assembly including a retainer cover affixed to the insert bracket, a retainer slidably engaged with the rail with one end of the retainer extending through an opening through one end of the insert, and a biasing member disposed between the retainer cover and the retainer biasing the retainer toward the insert.

In a further aspect, the retainer cover may include a pocket, the biasing member may be a spring, and one end of the spring may sit within the pocket and an opposing end of the spring may engage an end of the retainer opposite the insert.

In a further aspect, the armrest assembly may include an escutcheon disposed at the front of the arm affixed to the front of the arm and the front arm cap.

In a further aspect, the front arm cap may cover a portion of the one end of the insert and the rear arm cap may cover a portion of the opposing end of the insert to lock the insert in place on the arm and prevent the insert from being pulled apart from the arm.

In a further aspect, the armrest assembly may include a backrest recline actuator disposed along one side of the arm between the front of the arm and the insert.

In another aspect, embodiments of the inventive concepts disclosed herein are directed to an aircraft passenger seat including a seat bottom supported on a seat frame, a backrest, and armrest assembly movable between a stowed position and a deployed position, the armrest assembly including an arm having a top cutout, an insert bracket affixed within the arm adjacent the top cutout, a cup holder insert disposed within the top cutout and supported by the insert bracket and accessible for use when the arm is in the deployed position, a front arm cap affixed atop the arm and extending from near a front of the arm to one end of the cup holder insert, and a rear arm cap affixed atop the arm and extending from near a back of the arm to an opposing end of the cup holder insert.

In another aspect, the top cutout may be disposed proximate the front of the arm and may be continuous along a top of the arm and a portion of opposing sides of the arm.

In a further aspect, the cup holder insert may include a recessed center portion disposed between spaced upstanding concave walls.

In a further aspect, the armrest assembly may further include a rail affixed to the insert bracket and a retainer assembly disposed within the arm, the retainer assembly including a retainer cover affixed to the insert bracket, a retainer slidably engaged with the rail with one end of the retainer extending through an opening through one of the spaced upstanding concave walls, and a biasing member disposed between the retainer cover and the retainer biasing the retainer toward the recessed center portion.

In a further aspect, the armrest assembly may further include an escutcheon disposed at the front of the arm affixed to the front of the arm and the front arm cap.

In a further aspect, the front arm cap may cover a portion of the one end of the cup holder insert and the rear arm cap may cover a portion of the opposing end of the cup holder insert to lock the cup holder insert in place on the arm and prevent the cup holder insert from being pulled apart from the arm.

In a further aspect, the armrest assembly may further include a backrest recline actuator disposed on one side of the arm between the front of the arm and the cup holder insert, the seat recline actuator operable for releasing the backrest from a locked position.

In a further aspect, the arm may be pivotally attached near one end to a static frame member of the aircraft passenger seat such that the arm pivots between the stowed and deployed positions.

In another aspect, embodiments of the inventive concepts disclosed herein are directed to an armrest assembly including an arm having a top cutout, a cup holder insert removably disposed within the top cutout, a front arm cap affixed atop the arm and extending from near a front of the arm to one end of the cup holder insert, and a rear arm cap affixed atop the arm and extending from near a back of the arm to an opposing end of the cupholder insert, the front arm cap covering a portion of the one end of the cup holder insert and the rear arm cap covering a portion of the opposing end of the cup holder insert to lock the cup holder insert in place on the arm and prevent the cup holder insert from being pulled apart from the arm.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature or function. In the drawings.

DETAILED DESCRIPTION OF EXEMPLARY EMBODIMENTS

Figure 1:
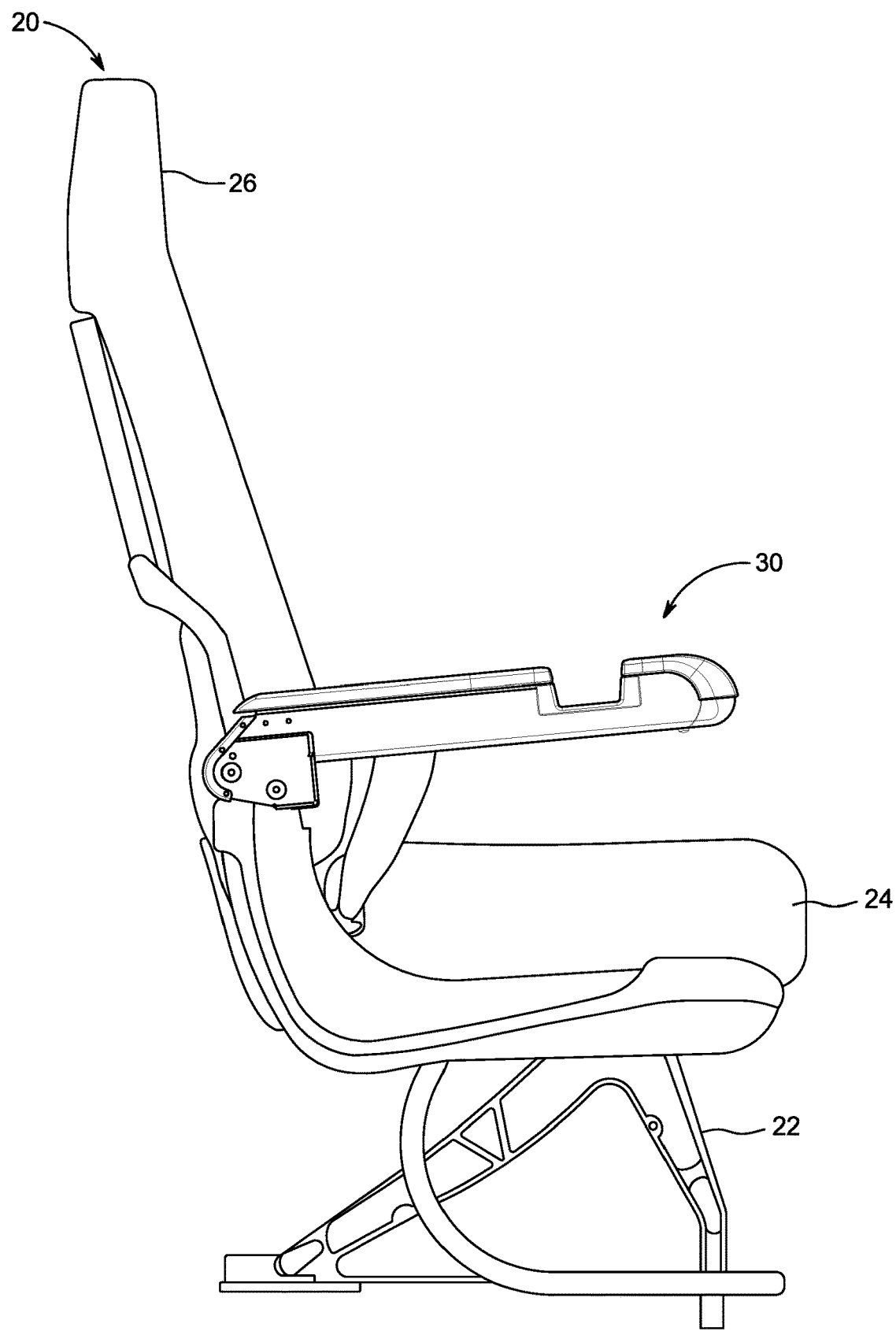
FIG. 1 is a perspective view of a non-limiting example of an economy class aircraft passenger seat compatible with an armrest assembly according to an exemplary embodiment.

The inventive concepts are described hereinafter with reference to the accompanying drawings in which exemplary embodiments are shown. However, the inventive concepts may be embodied in many different forms and should not be construed as limited to the representative embodiments set forth herein.

With reference to the drawing figures, the inventive concepts disclosed herein are directed to armrest assemblies generally including an insert configured to secure an item. The insert is retained in place on the arm such that a recessed portion of the insert is disposed at depth within the arm (i.e., below a top surface of the arm), such that the insert when not being used does interfere with use of the armrest. The insert does not require deployment, and therefore is available for use when the armrest is in a deployed position. The insert and configuration by which the insert is retained on the arm facilitates rapid insert removal for cleaning and replacement. Various inserts shapes, sizes and configurations are envisioned and are readily interchangeable for holding different items, for example, beverage containers, portable electronic devices, etc. The insert and other armrest assembly components may be made from durable lightweight materials including, but not limited to, plastics and aluminum.

Referring to FIG. 1, a non-limiting example of an economy class aircraft passenger seat is shown generally at reference numeral 20. The passenger seat 20 generally includes a seat base 22 adapted to be secured to the seat tracks, a seat bottom 24 supported atop the seat base 22, and a recline-capable backrest 26 configured to transition between upright and reclined sitting positions. The passenger seat 20 is further equipped with at least one armrest assembly 30, 70 according to embodiments discussed in detail below. The passenger seat 20 may be standalone or part of a group of adjacent seats configured as a row. A row may include shared structural support members, for example, legs, seat spreaders and transverse beams. A row configured with two passenger seats may be equipped with one or more armrest assemblies, preferably at least two armrest assemblies, wherein one armrest assembly is disposed between the adjacent seats and shared, and another armrest assembly is disposed at one end of the row for use by one of the seats. A row configured with three laterally-adjacent seats may be equipped with multiple armrest assemblies, for example, a first armrest assembly disposed between the aisle and center seats, a second armrest assembly disposed between the center and window seats, and a third armrest assembly disposed adjacent the aisle.

Each armrest assembly has a front and a back, wherein the front is detached, and the back may be pivotally attached to a static element of the passenger seat, for example, a seat spreader. Pivotal attachment allows the arm to pivot between stowed and deployed armrest positions, optionally through intermediate positions. The stowed position may correspond to a generally vertical orientation of the armrest in which the armrest is disposed alongside the backrest to facilitate seat ingress and egress. The deployed position may correspond to a generally horizontal orientation of the armrest in which the armrest is disposed forward of the backrest for use during flight. Intermediate armrest positions may correspond to any armrest angle between horizontal and vertical. The armrest assembly may lock in any of the fully stowed, fully deployed and intermediate armrest positions.

Figure 2:
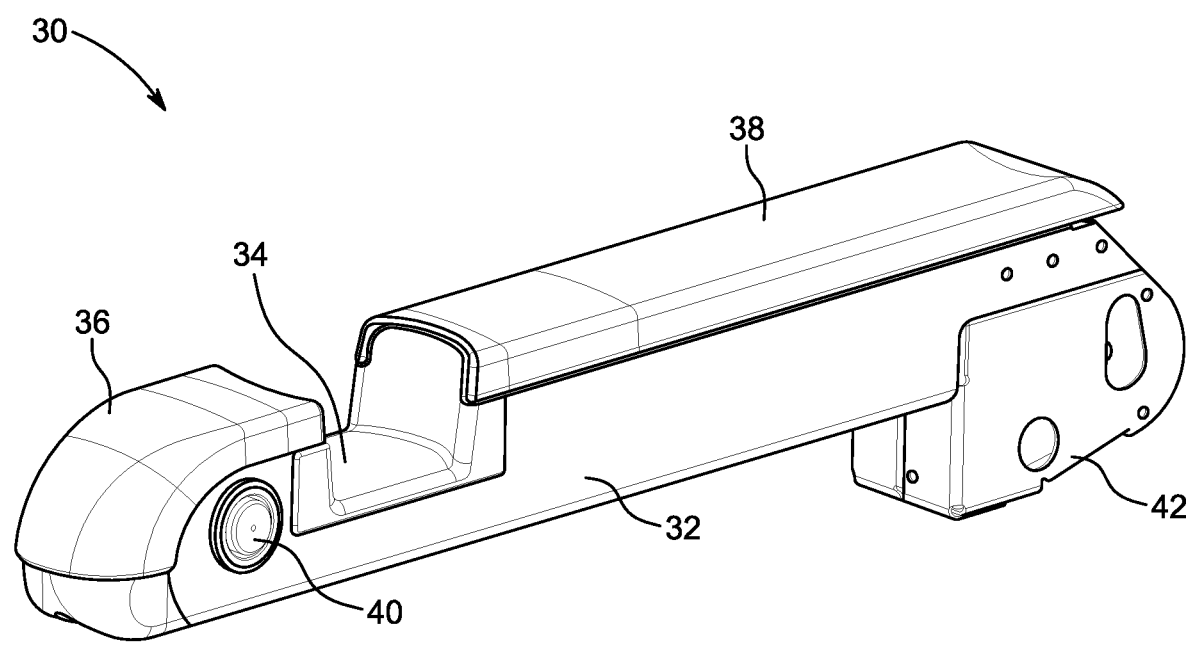
FIG. 2 is an isometric view of an embodiment of an armrest assembly including a cup holder insert.

FIG. 2 shows a fully assembled state of an armrest assembly 30 according to a first embodiment. The armrest assembly 30 generally includes an elongate arm 32, an insert 34 disposed in a top cutout of the arm, a front arm cap 36 closing out and padding the front portion of the arm, and a rear arm cap 38 closing out and padding the rear portion of the arm. The insert 34 is disposed at depth within the arm 30

(i.e., below a top surface of the arm caps) to better secure items relative to the arm, as well as position the insert out of the way of use of the armrest when the insert is unoccupied. The insert 34 generally includes a recessed center portion disposed between upstanding concave end walls. The sides of the insert are open such that secured items having a diameter greater than a width of the armrest can be accommodated. In passenger seats with recline-capable backrests, the backrest recline actuator 40 may be located on one side of the arm 32 between the front of the armrest and the insert for convenience of use. Known to those skilled in the art, the backrest actuator 40 may be a mechanical or electrical actuator depressed to unlock a gas spring or like device to allow the backrest 26 to return to upright. Cabling interconnecting the backrest actuator 40 and the locking gas spring may be routed within the arm, for example, below the installed insert.

The front arm cap 36 as shown covers the front top portion of the arm 32 forward of the insert 34 and may further overlap a portion of the opposing sides of the arm and the front extent of the arm for added comfort. More specifically, the front arm cap 36 extends from the front of the arm 32 to one end (e.g., the forward end) of the insert 34. The rear arm cap 38 as shown covers the rear top portion of the arm 32 rearward of the insert 34 and may further overlap a portion of the opposing sides of the arm for added comfort. More specifically, the rear arm cap 38 extends from the back of the arm 32 to the opposing end (e.g., the rear end) of the insert 34. The end of the front arm cap 36 adjacent the forward end of the insert 34 covers or overlaps a portion of the forward end of the insert, and the end of the rear arm cap 38 adjacent the rear end of the insert 34 covers or overlaps a portion of the rear end of the insert, such that the two arm caps 36, 38 when affixed atop the arm 32 retain the insert 34 in place within the top cutout, thereby preventing the insert from being pulled apart from the arm when the arm caps are installed. Each of the arm caps 36, 38 may be cushioned, padded and/or upholstered for comfort and aesthetics, and are detachably affixed to the arm 32 to allow the arm caps to be easily removed for replacement and to facilitate removal of the insert 34 for cleaning and replacement.

The armrest assembly 30 further includes a base 42 configured to be affixed to a static seat element. The arm 32 may be pivotably coupled to the base 42 to allow the arm to pivot relative to the base. Alternatively, the arm 32 and base 40 may together pivot relative to the fixed seat frame component between the fully stowed and fully deployed positions through optional intermediate positions. The armrest assembly 30 may further including static or dynamic close outs to conceal pinch points between moving components of the armrest assembly.

Figure 3:
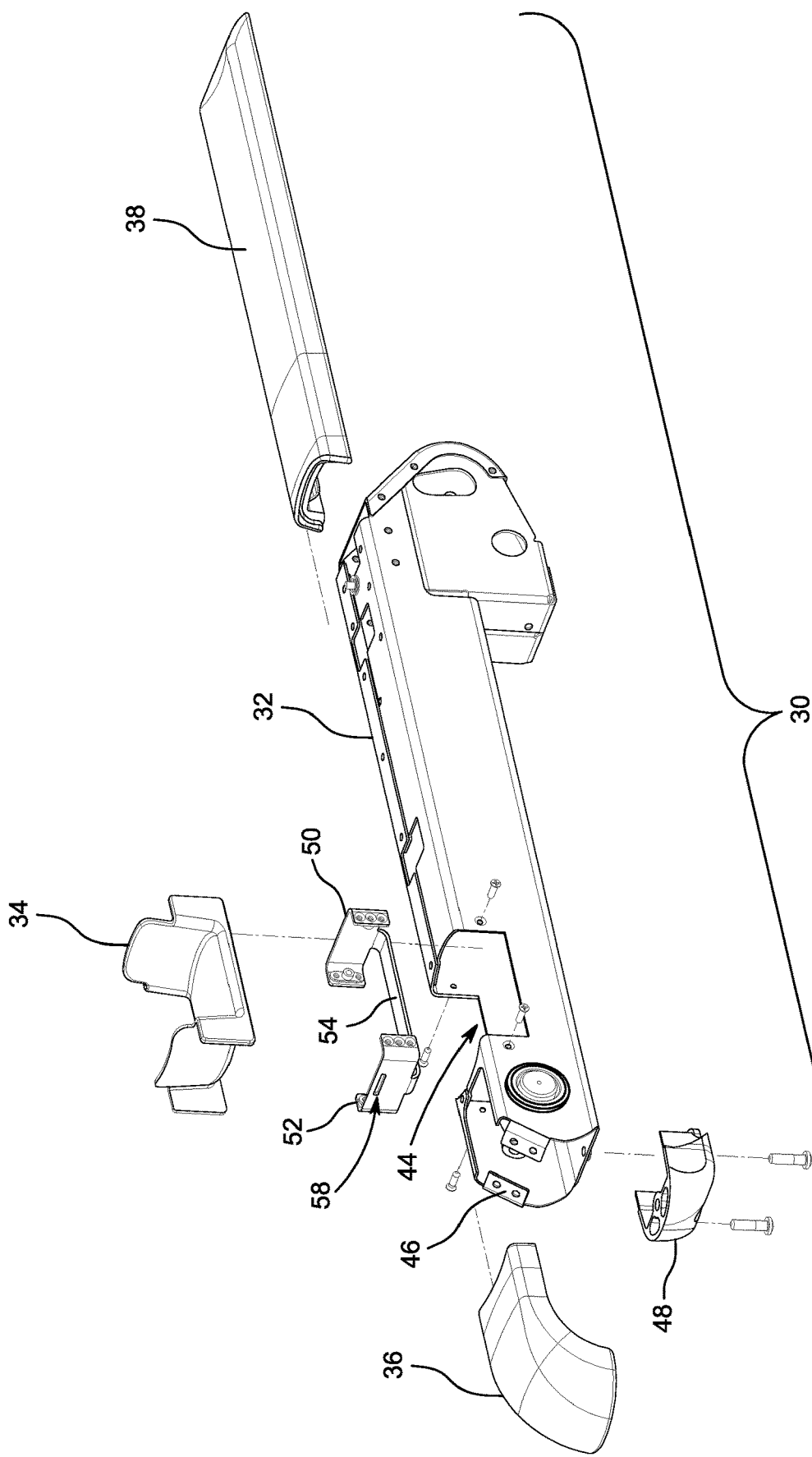
FIG. 3 is an exploded view of the armrest assembly of FIG. 2.

FIG. 3 shows a disassembled state of the armrest assembly 30. The arm 32 as shown is elongate and hollow and may be formed, for example, by stamping or bending metal such as aluminum. The arm includes openings through one or more of the opposing sides, top, bottom, and ends through which fasteners are received for attaching various components to the arm as well as affixing components within the arm. A top cutout 44 is provided near a forward end of the arm. The position of the top cutout 44 determines the position of the insert 34 along the length of the arm. Thus, the top cutout 44 can be provided closer to the front or back of the arm depending on the desired position of the insert. The top cutout 44 as shown is continuous along the top and opposing sides of the arm 32 such that the insert 34, and particularly the recessed center portion, is disposed at depth within the arm when the insert is installed on the arm. The insert 34 is received and retained in the top cutout 44. The shape and dimensions of the top cutout 44 may vary and correspond to the shape of the insert 34. The arm 32 may further include one or more bent metal tabs 46 at the forward end for detachably securing the front arm cap 36. An escutcheon 48 attaches near the forward end of the arm 32 and closes out the bottom half of the forward end. The escutcheon 48 may be affixed to the arm using threaded fasteners that secure to one or more of the arm 32 and the front arm cap 36.

Figure 4:
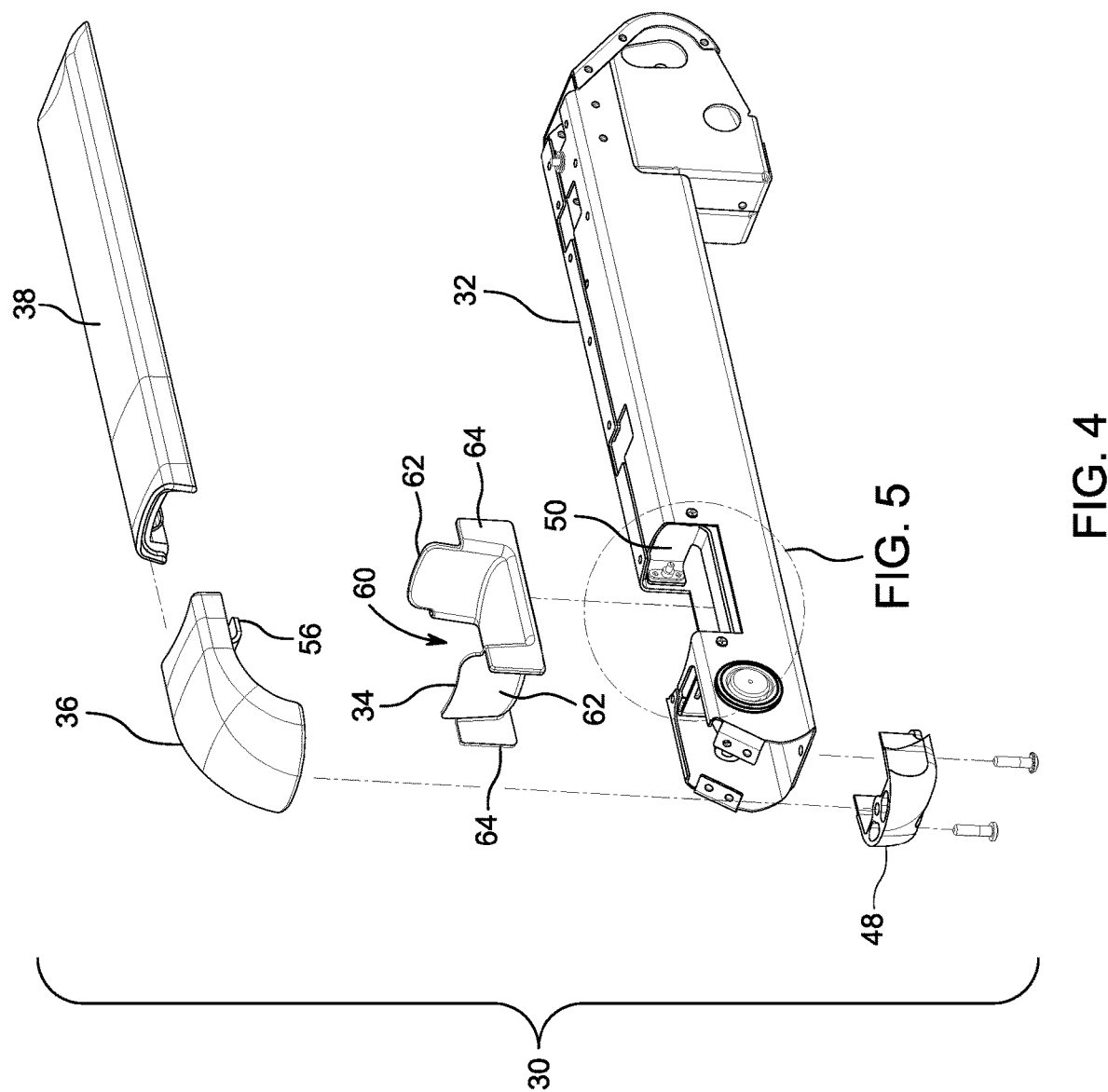
FIG. 4 is an exploded view of the armrest assembly of FIG. 2 shown with an insert bracket affixed within the arm.

Referring to FIGS. 3 and 4, an insert bracket 50 affixes within the arm 32 adjacent the top cutout 44 and serves to support the installed insert 34. The insert bracket 50 generally includes bracket ends 52 that affix to the arm 32 and an interconnecting bracket member 54 aligned adjacent the bottom of the top cutout 44. The bracket ends 52 may secure to the inner sidewalls of the arm 32 adjacent the opposing ends of the cutout, and the interconnecting member 54 floats within the arm along the bottom of the cutout. In this configuration, the insert bracket 50 generally follows the shape of the cutout to support the insert 34 installed atop the insert bracket. In embodiments in which the insert is made from durable, self-supporting material or embodiments lacking a retainer assembly as discussed below, the insert bracket may be optional.

One or more of the bracket ends 52 may have an elongate horizontal slot therethrough for receiving a tongue 56 on one of the front and rear arm caps 36, 38 to retain the arm caps on the arm through slide-lock engagement. For example, the tongue 56 on the front arm cap 36 may install through the slot 58 in the forward end of the insert bracket 50 to secure the rear end of the front arm cap adjacent the insert in place, and one or more of the tabs 46 and the escutcheon may help further secure the front of the front arm cap in place. Alternatively, one or more of the front and rear arm caps 36, 38 may include slide-lock engagement features that slide-lock engage within apertures through the top and or sides of the arm 32. Arm caps slide-lock engaged into their fully installed position may be locked in place using fasteners or the like.

The insert 34 as shown is a unitary molded body made of, for example, plastic. The insert 34 when configured as a cup holder generally includes a circular, recessed center portion 60 disposed and defined between spaced upstanding concave end walls 62. As shown, the concave end walls 62 are disposed near the opposing ends of the insert and positioned near the opposing ends of the top cutout 44 when the insert is installed on the arm 32. The end walls 62 are concave to partially define the circular recess for securing a beverage container, many of which are cylindrical. The end walls 62 may be vertical or may flare outward. As stated above, the sides of the insert 34 may be substantially open to accommodate a container diameter greater than the armrest width or a container having a shape other than cylindrical. Portions of the sides 64 of the insert, continuous from end-to-end of the insert and beneath the recess 60, overlapping portions of the sides of the arm 32 t when the insert is installed to secure the insert in place on the arm. The upstanding concave end walls 62 have a height generally corresponding to the height of the top cutout 44, and the distance between end walls 62 generally corresponds to the length of the top cutout. Inserts configured for securing items other than beverage containers may be utilized.

Figure 5:
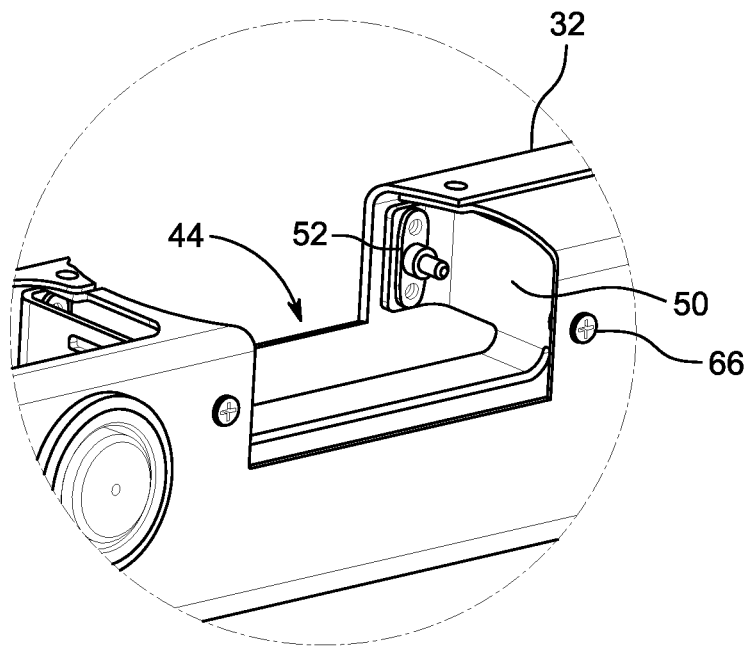
FIG. 5 is a detailed view of the top cutout of the arm.

FIG. 5 shows a detailed view of the top cutout 44 ready for insert installation. The insert bracket 52 is shown affixed within the arm 32. Threaded fasteners 66 may screw through the sides of the arm 32 to secure the bracket ends 52 in place. The seat recline actuator 40 is shown adjacent the top cutout 44.

Figure 6:
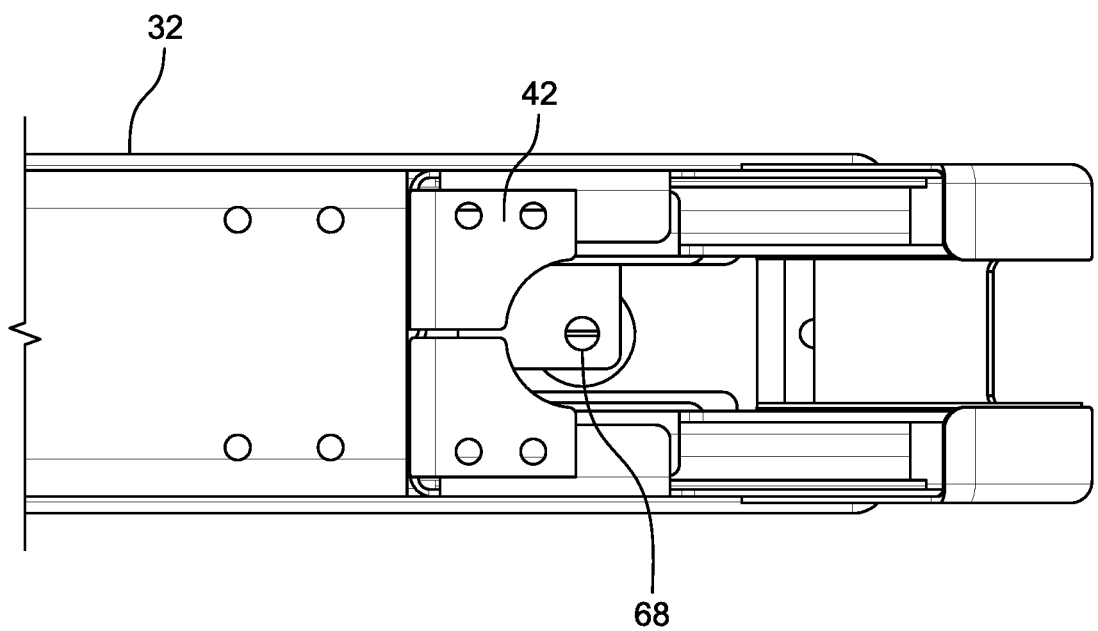
FIG. 6 is a bottom view of the back portion of the armrest assembly.

FIG. 6 shows the underside of the back of the armrest assembly 30 and the set screw 68 for detaching the arm 32 from the base 42 and/or adjusting the position of the arm relative to the base. As stated above, the arm 32 may pivot relative to the fixed base 42.

Figure 7:
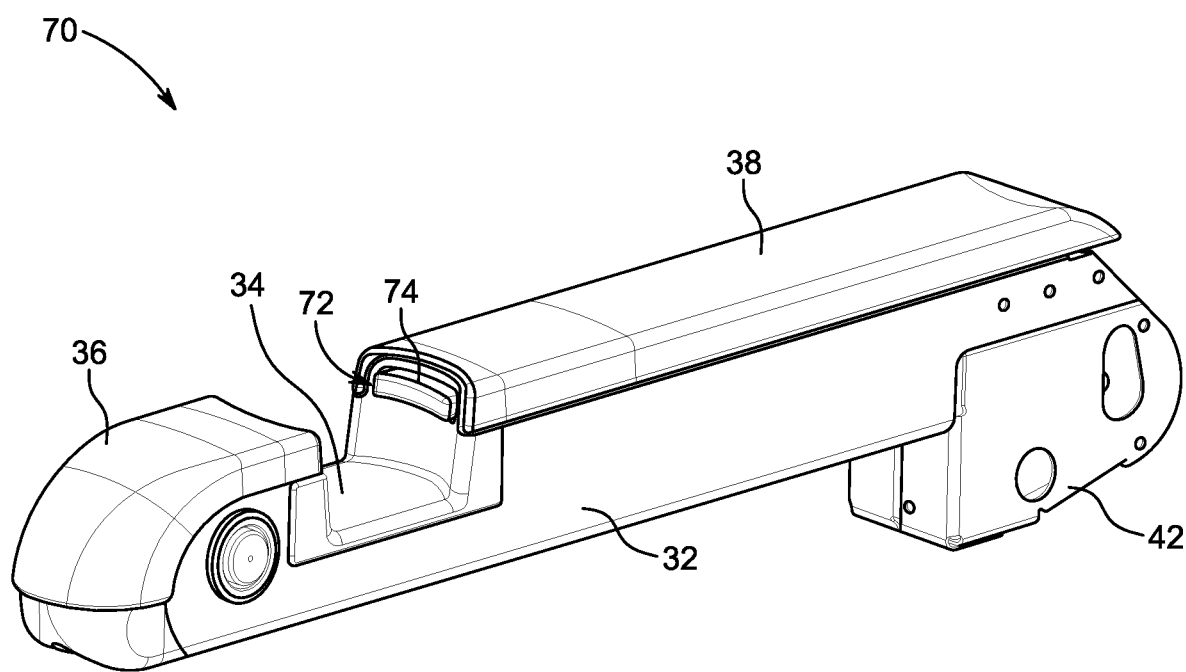
FIG. 7 is a perspective view of an embodiment of an armrest assembly including a cup holder retainer assembly.

FIG. 7 shows an armrest assembly 70 according to a second embodiment. The armrest assembly 70 has the same arm 32, base 42, front arm cap 36 and rear arm cap 38 in common with the armrest assembly 30 according the first embodiment, and therefore has substantially the same external appearance. The armrest assembly 70 according to the second embodiment further includes a retainer assembly 72 generally including a biased insert retainer 74 that deflects out of the insert space in response to force against the retainer 74 to help secure an item in place.

Figure 8:
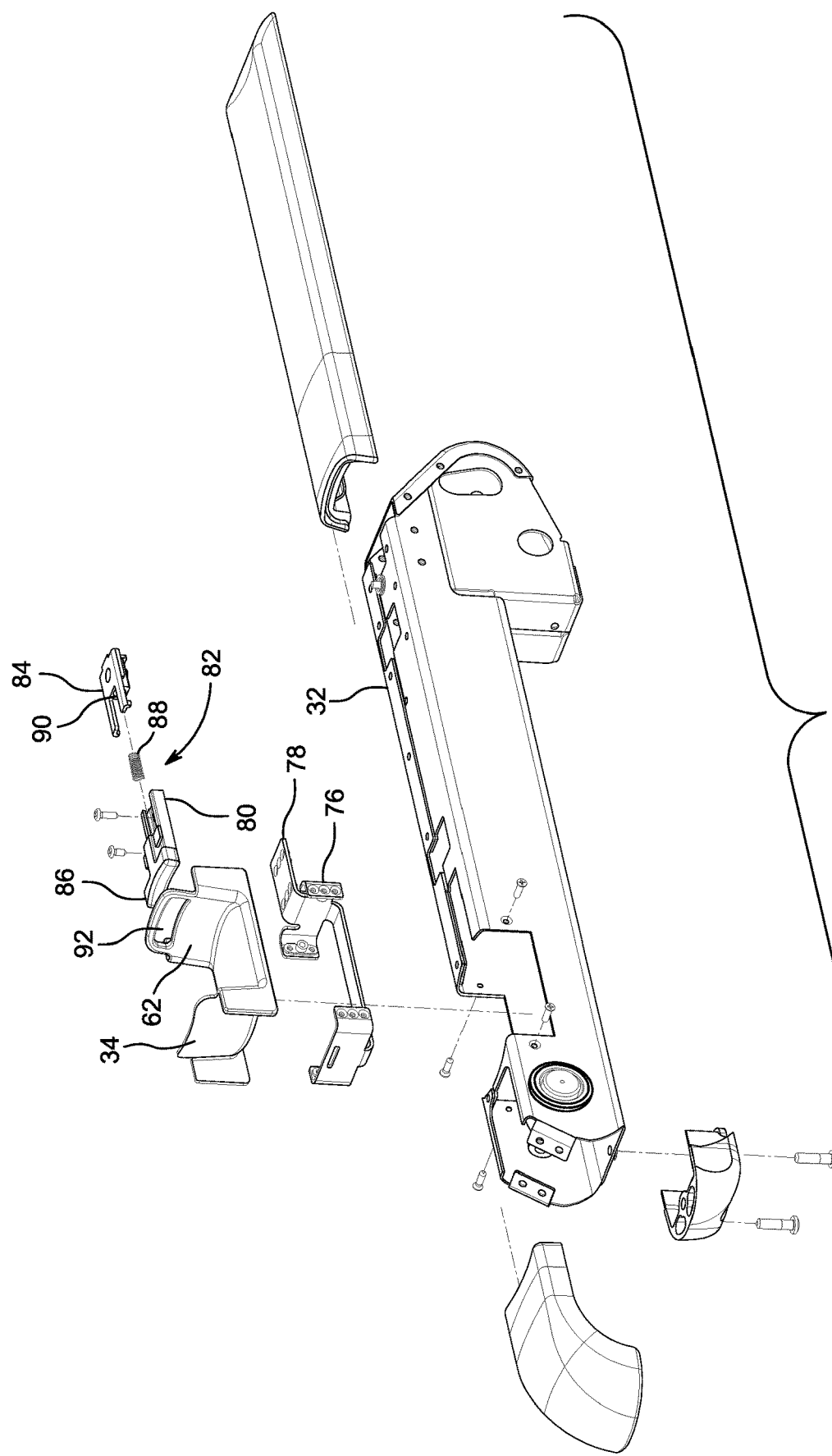
FIG. 8 is an exploded view of the armrest assembly of FIG. 7.

FIG. 8 shows a disassembled state of the armrest assembly 70. The insert bracket 76 of the second embodiment includes a tab 78 that extends away from the insert 34. The tab 78 serves as a mounting location for a rail 80 and retainer assembly 82. The rail 80 affixes atop the insert bracket 76. The retainer assembly 82 generally includes a retainer cover 84 that affixes to the insert bracket, a retainer 86 that slidably engages the rail 80, and a biasing member 88 disposed between the retainer cover and the retainer that biases the retainer toward the insert. One end of the biasing member 88 may sit in a pocket 90 defined in the retainer cover 84, while the opposing end of the biasing member 88 may engage an end of the retainer 86 apart from the insert 34. In a non-limiting example, the biasing member 88 may be a spring that compresses in response to force against the retainer 86 sufficient to cause the retainer to deflect away from the insert. Stored force in the compressed spring biases the retainer 86 toward the insert and into contact with a beverage container or other item in the insert to help retain the item in the insert.

Figure 9:
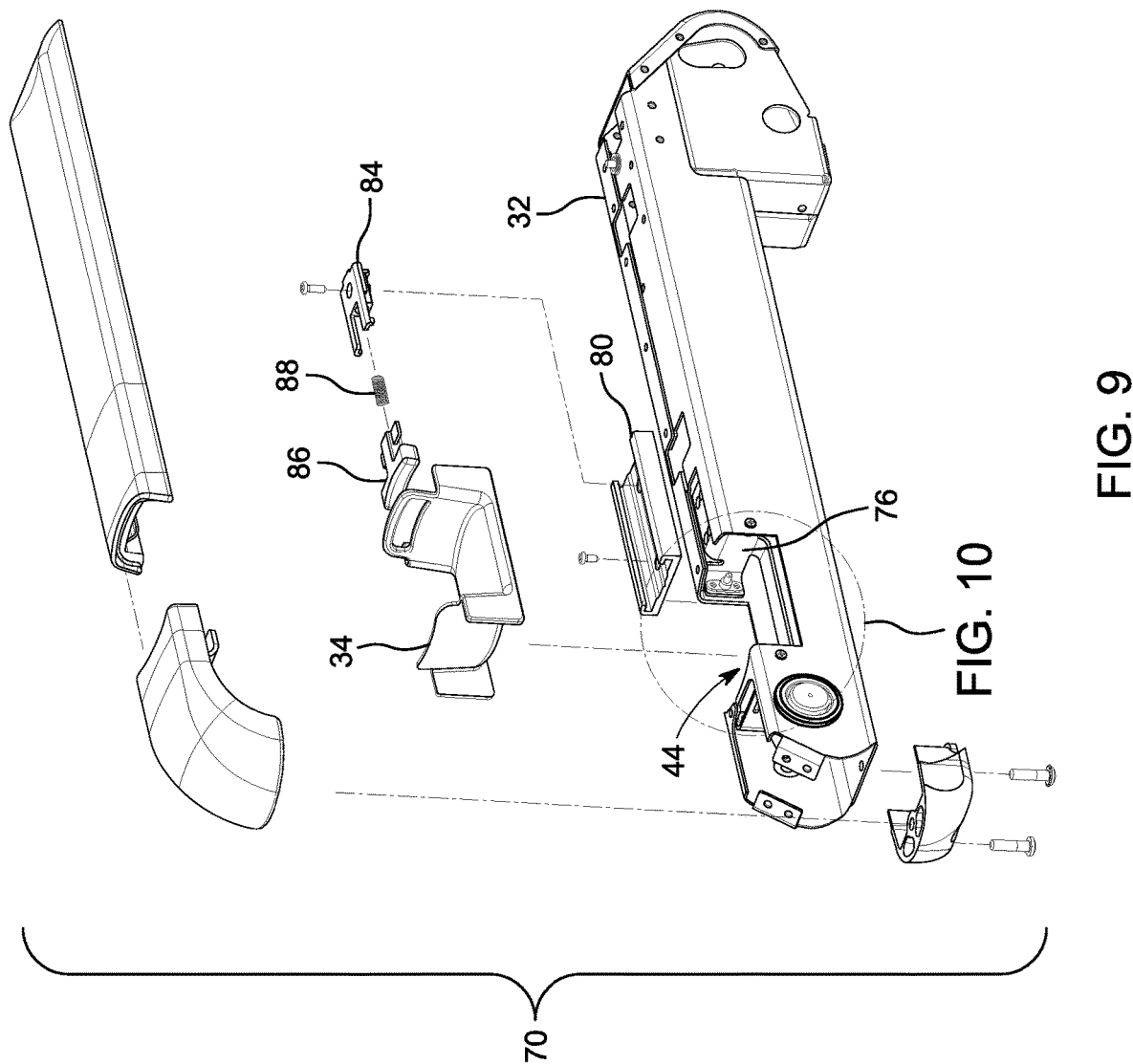
FIG. 9 is an exploded view of the armrest assembly of FIG. 7 shown with an insert bracket affixed within the arm.
Figure 10:
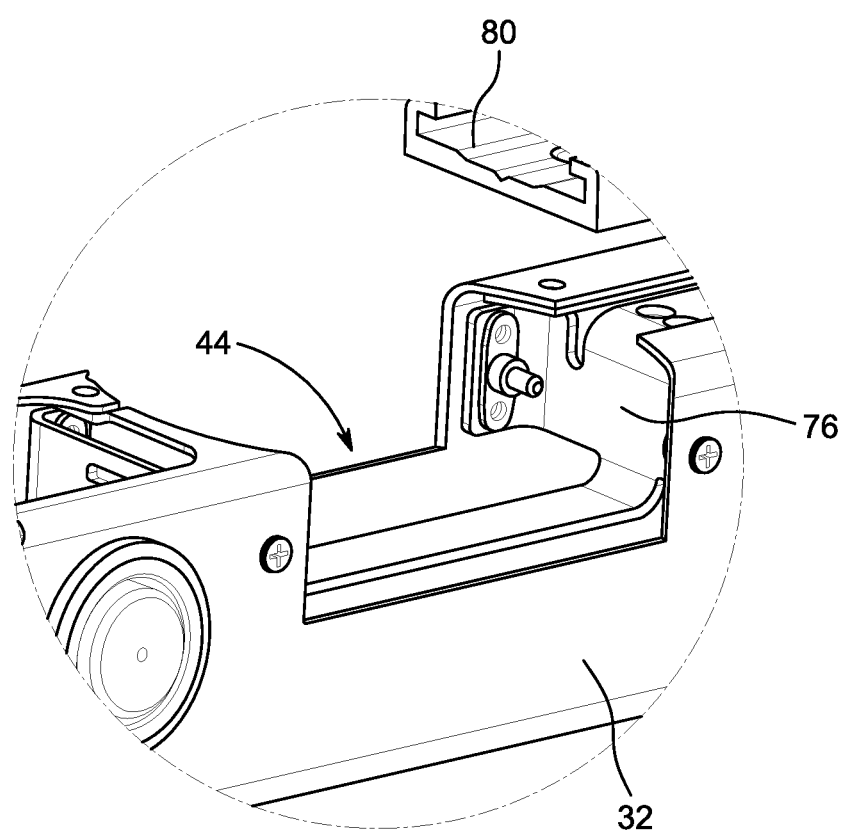
FIG. 10 is a detailed view of the top cutout of the arm.

One end of the retainer 86 extends through a window 92 defined through one of the concave end walls 62. The window 92 is disposed near a top of the respective end wall 62 such that the retainer 86 is elevated above a floor of the recessed center portion 60 of the insert 34. In response to force against the retainer 86, the retainer slides inward along the rail 80 thereby compressing the spring. FIG. 9 shows the insert bracket 76 affixed within the arm 32, while FIG. 10 is a detailed view showing the top cutout 44, insert bracket 76 affixed within the arm 32, and rail 80 positioned to be affixed to the insert bracket 76. Depending on the location of the top cutout 44 with respect to the arm, the retainer assembly may be disposed forward or rearward of the insert 34. In another exemplary embodiment, the armrest assembly may include two retainer assemblies, one forward of the insert and the other rearward of the insert.

The foregoing description provides embodiments of the inventive concepts by way of example only. It is envisioned that other embodiments may perform similar functions and/or achieve similar results. Any and all such equivalent embodiments and examples are intended to be covered by the appended claims.

What is claimed is:

1. An armrest assembly, comprising:
   an arm comprising a top cutout;
   an insert bracket affixed within the arm adjacent the top cutout;
   an insert removably disposed within the top cutout and supported by the insert bracket;
   a front arm cap affixed atop the arm and extending from near a front of the arm to a front of the insert one end of the front arm cap covering the front of the insert to retain the insert in the top cutout; and
   a rear arm cap affixed atop the arm and extending from near a back of the arm to a back of the insert one end of the rear arm cap covering the back of the insert to retain the insert in the top cutout.

2. The armrest assembly of claim 1, wherein the top cutout is disposed proximate the front of the arm and is continuous along a top of the arm and a portion of opposing sides of the arm.

3. The armrest assembly of claim 1, wherein the insert is a cup holder comprising a recessed center portion disposed at depth within the arm and between spaced upstanding concave walls.

4. The armrest assembly of claim 1, wherein each side of the insert comprises an open portion and a portion that overlaps a respective side of the arm.

5. The armrest assembly of claim 1, further comprising:
   a rail affixed atop the insert bracket; and
   a retainer assembly disposed within the arm, the retainer assembly comprising:
      a retainer cover affixed to the insert bracket;
      a retainer slidably engaged with the rail with one end of the retainer extending through an opening through one end of the insert; and
      a biasing member disposed between the retainer cover and the retainer biasing the retainer toward the insert.

6. The armrest assembly of claim 5, wherein the retainer cover comprises a pocket, the biasing member is a spring, and one end of the spring seats within the pocket and an opposing end of the spring engages an end of the retainer opposite the insert.

7. The armrest assembly of claim 1, further comprising an escutcheon disposed at the front of the arm affixed to the front of the arm and the front arm cap.

8. The armrest assembly of claim 1, further comprising a backrest recline actuator disposed along one side of the arm between the front of the arm and the insert.

9. An aircraft passenger seat, comprising:
   a seat bottom supported on a seat frame;
   a backrest; and
   an armrest assembly, the armrest assembly movable between a stowed position and a deployed position, the armrest assembly comprising:
      an arm comprising a top cutout;
      an insert bracket affixed within the arm adjacent the top cutout;
      a cup holder insert disposed within the top cutout and supported by the insert bracket and accessible for use when the arm is in the deployed position;
      a front arm cap affixed atop the arm and extending from near a front of the arm to a front of the cup holder insert one end of the front arm cap covering the front of the cup holder insert to retain the cup holder insert in the top cutout; and
      a rear arm cap affixed atop the arm and extending from near a back of the arm to a back of the cup holder insert one end of the rear arm cap covering the back of the cup holder insert to retain the cup holder insert in the top cutout.

10. The aircraft passenger seat of claim 9, wherein the top cutout is disposed proximate the front of the arm and is continuous along a top of the arm and a portion of opposing sides of the arm.

11. The aircraft passenger seat of claim 9, wherein the cup holder insert comprises a recessed center portion disposed at depth within the arm and between spaced upstanding concave walls disposed near opposing ends of the insert.

12. The aircraft passenger seat of claim 11, the armrest assembly further comprising:
a rail affixed to the insert bracket; and
a retainer assembly disposed within the arm, the retainer assembly comprising:
a retainer cover affixed to the insert bracket;
a retainer slidably engaged with the rail with one end of the retainer extending through an opening through one of the spaced upstanding concave walls; and
a biasing member disposed between the retainer cover and the retainer biasing the retainer toward the recessed center portion.

13. The aircraft passenger seat of claim 9, the armrest assembly further comprising an escutcheon disposed at the front of the arm affixed to the front of the arm and the front arm cap.

14. The aircraft passenger seat of claim 9, the armrest assembly further comprising a backrest recline actuator disposed on one side of the arm between the front of the arm and the cup holder insert, the seat recline actuator operable for releasing the backrest from a locked position.

15. The aircraft passenger seat of claim 9, wherein the arm is pivotally attached near one end to a static frame member of the aircraft passenger seat such that the arm pivots between the stowed and deployed positions.

16. An armrest assembly, comprising:
an arm comprising a top cutout;
a cup holder insert removably disposed within the top cutout;
a front arm cap affixed atop the arm and extending from near a front of the arm to a front of the cup holder insert; and
a rear arm cap affixed atop the arm and extending from near a back of the arm to a back of the cup holder insert;
wherein the front arm cap covers the front of the cup holder insert and the rear arm cap covers the back of the cup holder insert to retain the cup holder insert in place in the top cutout and prevent the cup holder insert from being pulled apart from the arm.

17. The armrest assembly of claim 16, wherein the cup holder insert comprises a recessed center portion disposed between spaced upstanding concave end walls.

18. The armrest assembly of claim 16, further comprising:
an insert bracket affixed within the arm adjacent the top cutout;
a rail affixed to the insert bracket; and
a retainer assembly disposed within the arm, the retainer assembly comprising:
a retainer cover affixed to the insert bracket;
a retainer slidably engaged with the rail with one end of the retainer extending through an opening through one end of the cup holder insert; and
a biasing member disposed between the retainer cover and the retainer biasing the retainer toward the cup holder insert.

* * * * *